United States Patent [19]

Lau

[11] Patent Number: 4,727,938

[45] Date of Patent: Mar. 1, 1988

[54] TRONA-ENHANCED STEAM FOAM OIL RECOVERY PROCESS

[75] Inventor: Hon C. Lau, Houston, Tex.

[73] Assignee: Shell Oil Company, Houston, Tex.

[21] Appl. No.: 15,243

[22] Filed: Feb. 17, 1987

[51] Int. Cl.$^4$ .............................................. E21B 43/24
[52] U.S. Cl. ................................. 166/270; 166/272; 166/274; 166/303
[58] Field of Search ............... 166/270, 272, 273, 274, 166/252, 303, 309

[56] References Cited

U.S. PATENT DOCUMENTS

| | | | |
|---|---|---|---|
| 3,690,376 | 9/1972 | Zwicky et al. | 166/272 |
| 3,977,470 | 8/1976 | Chang | 166/273 |
| 4,004,638 | 1/1977 | Burdyn et al. | 166/273 |
| 4,086,964 | 5/1978 | Dilgren et al. | 166/272 |
| 4,393,937 | 7/1983 | Dilgren | 166/272 |
| 4,502,541 | 3/1985 | Lawson et al. | 166/270 X |
| 4,532,993 | 8/1985 | Dilgren et al. | 166/303 |
| 4,607,695 | 8/1986 | Weber | 166/272 |

*Primary Examiner*—Stephen J. Novosad

[57] ABSTRACT

In a continuous or cyclic steam foam drive, recovery of an acidic reservoir oil (1) is improved by injecting steam accompanied by (a) enough dissolved alkaline monovalent salt to ion-exchange multivalent cations from the reservoir rocks and precipitate those ions in compounds which are insoluble in an alkaline aqueous liquid as well as forming soaps of the reservoir oil acids and (b) surfactants for foaming the steam and increasing the salt tolerance of an aqueous surfactant system containing the soaps of the reservoir oil acids, and (2) is further improved by using trona or an equivalent mixture of alkali metal carbonates and bicarbonates as the alkaline monovalent salt.

9 Claims, 2 Drawing Figures

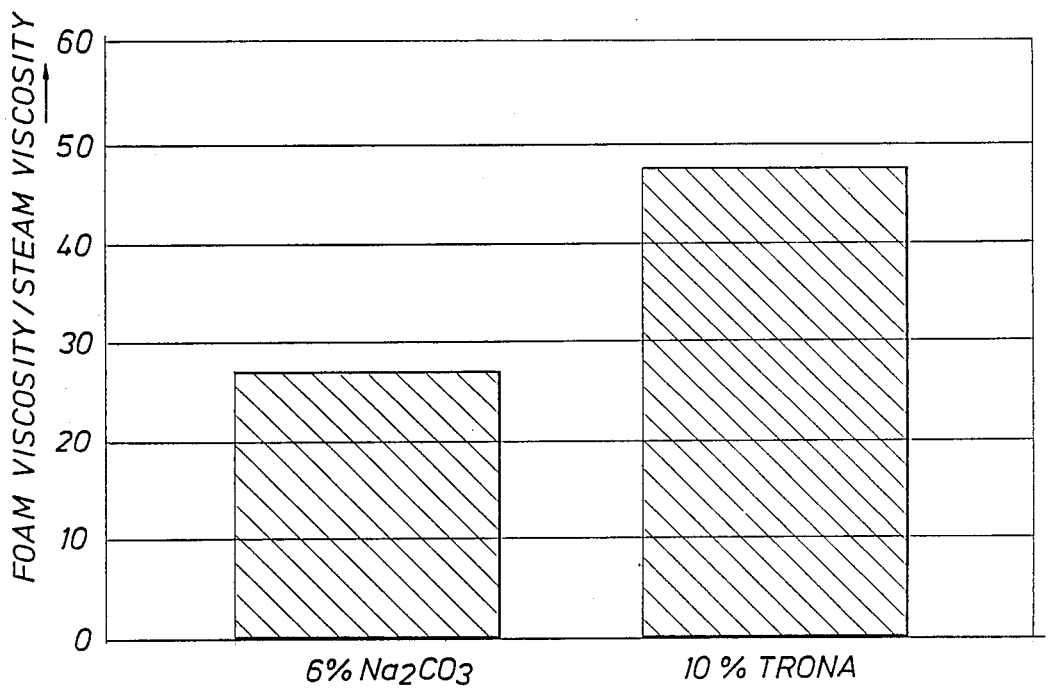
FIG.1 COMPARISON OF FOAM STRENGTH
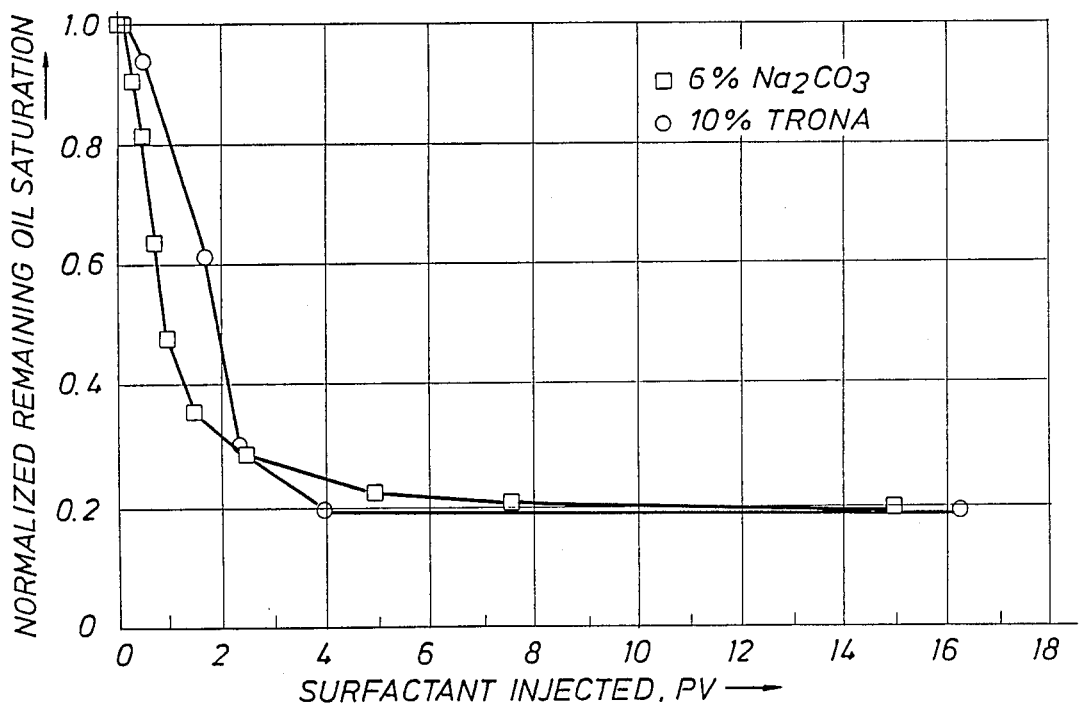
FIG.2 COMPARISON OF REMAINING OIL SATURATION BETWEEN ALKALINE STEAM FOAMS USING $Na_2CO_3$ AND TRONA

TRONA-ENHANCED STEAM FOAM OIL RECOVERY PROCESS

BACKGROUND OF THE INVENTION

The invention relates to a steam foam process for producing a relatively low gravity acidic oil from a subterranean reservoir. More particularly, it relates to an improved alkali-enhanced steam foam drive or soak process for recovering such oil.

The present invention relates to an improved alkali-enhanced steam foam oil recovery process such as the process described in my commonly assigned U.S. Pat. No. 4,609,044, the disclosures of which are incorporated herein by reference.

Numerous aqueous alkaline flood processes have been proposed, and various processes involving injecting an aqueous alkaline solution and various preformed surfactants have been described in U.S. patents such as the following: U.S. Pat. No. 3,777,817 describes injecting an aqueous alkaline solution to satisfy the surfactant adsorption sites on the reservoir rock and then injecting a surfactant-containing aqueous liquid which may also contain alkali. U.S. Pat. Nos. 3,804,171 and 3,847,823 describe injecting aqueous alkaline solutions containing overbased petroleum sulfonate surfactants which are formed by over-neutralizing petroleum hydrocarbon sulfonates. U.S. Pat. Nos. 3,977,470 and 4,004,638 describe injecting an aqueous alkaline solution followed by an aqueous alkaline solution which contains a preformed surfactant which can be substantially any hydrocarbon sulfonate and can be accompanied by polyphosphates and carbonates that enhance the oil displacing efficiency of the process. U.S. Pat. No. 4,099,569 describes a staged process for recovering oil from a subterranean reservoir by injecting a surfactant solution in which the concentration of the surfactant is increased as increasing amounts of the solution are injected, then injecting a drive fluid. U.S. Pat. No. 4,232,737 describes a staged injection of a highly saline aqueous petroleum sulfonate surfactant system containing a solubilizing amount of cosurfactant and decreasing the concentration of both the salt and surfactant in stages to provide a trailing-edge salinity which is suitable for a polymer thickened aqueous drive fluid. U.S. Pat. No. 4,502,541 by J. B. Lawson and D. R. Thigpen, describes a cosurfactant-aided aqueous alkaline oil recovery process in which an oil displacing fluid containing at least one each of dissolved alkaline material, a substantially neutral salt and a preformed cosurfactant is injected with a concentration gradient such that the initially injected portion of fluid contains a larger proportion of preformed cosurfactant than later injected portions.

Commonly assigned U.S. patent application Ser. No. 411,779, filed Aug. 26, 1982 by D. R. Thigpen, J. B. Lawson and R. C. Nelson (i.e. the "'779 application"), now abandoned, relates to recovering oil from an acidic oil reservoir by injecting an alkaline aqueous solution. In the process of the '779 application, the alkaline solution also contains a substantially neutral salt and a preformed cosurfactant. It uses a cosurfactant comprising at least one compound which is significantly soluble in both the aqueous solution and the reservoir oil while being more soluble in the aqueous solution (relative to its solubility in the reservoir oil) than are the petroleum acid soaps which can be formed from the reservoir oil. The cosurfactant solution is selected and its concentration is adjusted so that the injected solution has an alkalinity, salinity and preformed cosurfactant content such that the salinity of the surfactant system formed by the interaction of the injected solution and the reservoir oil is substantially optimum for minimizing interfacial tension between the oil and surfactant system. The disclosures of the '779 application are incorporated herein by reference.

As indicated in the '779 application, although prior processes in which preformed surfactants were included in injected aqueous liquid solutions were designed to improve the oil recovery efficiency of similar processes free of the preformed surfactants, a serious problem remained in either type of such prior processes. Whenever an aqueous alkaline solution is injected into an oil reservoir, some or all of the alkali may be consumed by chemical reactions other than the desired reaction of converting petroleum acids to surfactant soaps. For example, multivalent cations dissolved in the water in the reservoir and/or associated with clay or other reservoir rock material can rapidly consume alkali by forming and precipitating multivalent metal hydroxides or salts. In siliceous reservoirs significant proportions of alkali are consumed by dissolving silicon oxide and by forming alkali metal silicates, etc. Because of such side reactions, if the injected aqueous alkaline solution is dilute, the alkali will propagate slowly through the reservoir rocks. The frontal propagation rate is slow because, as each portion of the injected solution contacts fresh portions of rock, some or all of its alkali content may be consumed by the side reactions. This is repeated over and over, and thus, although the unreactive liquid components of the injected solution may move through the reservoir at the rate corresponding to the rate at which the solution was injected, the movement through the reservoir of the alkali may be much slower. For example, it is disclosed in SPE Paper No. 8995 by Bunge et al that, when an aqueous alkaline solution containing 0.44% sodium hydroxide and 1.0% sodium chloride was flowed through a core of Wilmington sand which initially contained 1.0% calcium chloride solution; more than two pore volumes of the aqueous alkaline solution had to be injected before any of the sodium hydroxide reached the outflow end of the core.

With respect to steam drive or soak processes for recovering oil, various uses of alkali have been proposed. Such proposals are contained in U.S. Patents such as the following. U.S. Pat. No. 3,853,178 suggests adding about 0.05 to 0.1 percent of alkali metal hydroxides to the liquid phase of steam to react with connate water (Col. 2, line 67) or boiler feed water (Col. 3, line 24) to form surface active agents. U.S. Pat. No. 3,924,683 suggests conducting a steam soak process with "very small amounts" (Col. 1, line 41) of alkali, preferably from 0.05 to 0.6 percent (Col. 2, line 62) added to the steam.

In addition, during the generation of steam in the field, the liquid effluent from the steam generator may have a high pH. This is because bicarbonate ions in the steam generator feedwater decompose to $CO_2$ and hydroxide ions. The $CO_2$ partitions into the vapor phase and the $OH^-$ ions partition into the liquid phase thus raising the solution pH. The pH of liquid effluents from steam generators in the San Joaquin Valley have been reported to range from 10.8 to 11.6. It is therefore conceivable that, to some extent, in such steam soaks or steam drive processes in heavy-crude oil reservoirs, alkaline floods may be taking place. However, such alkaline floods have little if any effect since their alkalinity is largely confined to the small regions near the injectors; because of the high alkali consumption and the non-optimum conditions for an alkaline flood process.

Alkali metal carbonate salts, particularly the bicarbonate salts, are known to have demonstrated or proposed effects of various types in connection with steam heated thermal drives or soaks. For example, U.S. Pat. No. 3,690,376 by R. W. Zwicky relates to recovering hydrocarbons from underground formations containing mixtures of the hydrocarbons with aqueous solutions of polyvalent metal salts. A steam composition containing a basic salt and a sequestering agent is injected, using a sequestering agent comprising a chelating or precipitating material such as alkali metal sulfates, sulfides, or the like, and using a basic salt comprising an alkali metal carbonate or bicarbonate. The presence of the carbonate and sequestering agent are said to function synergistically to form an emulsifiable mobility front capable of preventing steam fingering. U.S. Pat. No. 4,572,296 relates to a reservoir steaming process for inhibiting the dissolution of silica from the reservoir rock or a gravel pack where the boiler feed water contains bicarbonate ions and forms $CO_2$ that partitions into the gas phase while hydroxyl ions remain in the liquid phase and increase the alkalinity. An ammonium ion-containing compound is added so that ammonia partitions into the gas phase while hydrogen chloride remains in the liquid phase and counteracts the increase in alkalinity.

SUMMARY OF THE INVENTION

The present invention relates to an improvement in a process in which steam and steam-foaming surfactant are injected into a subterranean reservoir for displacing a relatively acidic oil toward a production location. In a preferred form of such a process, the injection of the steam is accompanied by or preceded by an injection of (a) a kind and amount of water-soluble alkaline material effective for ion-exchanging multivalent cations from the reservoir rocks, precipitating them into compounds which are insoluble in an aqueous alkaline liquid and causing the aqueous liquid phase of the injected fluid to form soaps of substantially all of the petroleum acids in the reservoir oil, and (b) at least one surfactant providing a surfactant capability for foaming steam and functioning as a cosurfactant for increasing the salinity requirement of an aqueous surfactant system in which soaps derived from the reservoir oil comprise primary surfactants. In accordance with the present invention, said alkaline material consists essentially of a substantially equal molar mixture of alkali metal carbonates and bicarbonates such as a mixture which is, or is substantially equivalent to, trona.

DESCRIPTION OF THE DRAWING

FIG. 1 shows a comparison of foam strength for steam foams containing respectively, sodium carbonate and trona, established in comparative core flooding experiments.

FIG. 2 shows a comparison of remaining oil saturation during comparative core flooding experiments using steam foams containing respectively, sodium carbonate and trona, with increasing amounts of injected fluid.

DESCRIPTION OF THE INVENTION

Generally effective steam foam drive or steam soak processes are known. For example, U.S. Pat. No. 4,086,964 by R. E. Dilgren, G. J. Hirasaki, D. G. Whitten and H. J. Hill describes recovering oil by injecting a steam-foam-forming mixture through a steam channel which extends essentially between injection and production wells and U.S. Pat. No. 4,393,937 by R. E. Dilgren and K. B. Owens describes a similar steam-foam-forming mixture in which the surfactant is a particularly effective olefin sulfonate surfactant as well as methods of using such a mixture in steam drive or steam soak oil recovery processes. The disclosures of these patents are incorporated herein by reference.

In a preferred embodiment of my prior invention, the alkali-enhanced steam foam process consists of two phases. The first phase consists of injecting a preflood (or preflush) of alkali, at a relatively high concentration (e.g., equivalent to a $Na_2CO_3$ concentration of about 3 wt.% or above). Steam is also injected in this phase. The purpose is to ion-exchange the multivalent cations from the clays and precipitate the multivalent cations by alkali. If the reservoir already has a substantial steam chest, the preflood may be less effective because of gravity segregation. So, it may be desirable to inject a surfactant with the alkali and steam to form a steam foam to transport the alkali up into the steam zone. However, such a use of the surfactant in the preflood is optional, and may not be needed in a relatively thin reservoir. The alkali concentration in the preflood should, preferably, be higher than that in the continuous injection that follows.

The second phase consists of injecting an alkali, a steam foam surfactant (with or without NaCl), and steam continuously into the formation. But particularly toward the end of the process, both the surfactant and alkali concentrations can be decreased.

As indicated in my prior patent, there are three main benefits of the so proposed alkali-enhanced steam foam drive:

1. The adverse effect of multivalent cations on steam foam surfactant propagation is suppressed. This occurs because the water solubilities of carbonate or silicate, or the like, salts of multivalent ions such as calcium and magnesium are very low. Surfactant retention due to precipitation and partitioning are reduced.

2. Surfactant retention due to adsorption on the rock surface is reduced. The high pH generated by the alkali causes the clay surfaces to be more negatively charged thus reducing adsorption of the anionic steam foam surfactant.

3. The residual oil saturation is lowered due to emulsification of oil into small drops caused by the action of steam, alkali, and a cosurfactant. Our microvisual flow studies have shown that the size of these oil drops can be smaller than the size of a pore throat, thus making their displacement much easier.

In addition, benefits (1) and (2) increase the rate of surfactant propagation and hence the rate of foam propagation. And, benefit (3) increases the displacement efficiency by lowering the residual oil saturation.

The present invention offers the following improvements over prior alkaline steam foam processes:

1. In alkali-enhanced steam foam drives having the same total alkalinity, trona forms solutions having a lower pH than those formed by sodium carbonate to an extent that reduces the consumption of alkali by clay transformation reactions.

2. When in contact with steam, trona generates $CO_2$ which remains noncondensible to form a stronger foam, i.e. a foam with a higher apparent viscosity. This provides more mobility control which is a major reason for using foam.

3. Because the $CO_2$ acts as a noncondensible gas to stabilize the steam foam, it thereby eliminates or reduces the need to add a noncondensable gas, e.g. nitrogen. Therefore, oil recoveries at least substantially as high as those obtainable by prior processes in which a noncondensible gas is injected along with the steam, are obtained without the expense and difficulty of adding such a noncondensible gas or with less quantities of such a noncondensible gas.

Comparative tertiary corefloods were run to compare the mobility and remaining oil saturation of alkaline foams formed by 6 wt% $Na_2CO_3$ and 10 wt% trona solutions each containing 0.25 wt% Enordet® AOS 1618 (an alpha-olefin sulfonate surfactant from Shell Chemical Company). In each experiment, an Ottawa sandpack was used. The pack was saturated with reservoir crude. Hot water was then injected until residual oil saturation was established. This was followed by 10 PV of 50% quality steam. Then steam foam was injected. Foam components for the two experiments were as follows:

$Na_2CO_3$ experiment:
 50% quality steam with 0.6 mole percent nitrogen in the vapor phase;
 6 wt% $Na_2CO_3$ and 0.25 wt% Enordet® AOS 1618 in the aqueous phase.

Trona experiment:
 50% quality steam with no nitrogen vapor phase;
 10 wt% trona with 0.25 wt% Enordet® AOS 1618 in aqueous phase.

Results were as follows:

1. Alkaline steam foam formed by trona without added nitrogen had a higher apparent viscosity than one formed by $Na_2CO_3$ with added nitrogen (FIG. 1).

2. Both trona and $Na_2CO_3$ steam foams gave essentially the same low residual oil saturation. As shown in FIG. 2, almost identical normalized remaining oil saturation curves were obtained for both experiments.

Experiments were performed to compare alkalinity consumption of trona and $Na_2CO_3$ solutions by Kernridge sands at 280° F. A total alkalinity of 1.70 meq/g was used for both solutions. This corresponded to 9% $Na_2CO_3$ and 15 wt% trona. In these experiments, 20 g of calcium-free Kernridge sands were put in contact with 11 ml of the alkaline solution in stainless steel tubes. A noncondensible gas cap was put on top of the solutions. The tubes were sealed with Swaglok seals and heated in an oven at 280° F. After two months, the tubes were removed form the oven, quenched to room temperature, and opened. Liquid samples were taken from the tubes and analyzed for pH and alkalinity.

The following results were obtained:

| Sample | Initial pH* | Final pH* | Loss of $CO_3^=$ (meq/100 g)** |
|---|---|---|---|
| $Na_2CO_3$ | 11.81 | 10.19 | 17.0 |
| trona | 9.89 | 9.39 | 9.5 |

*pH measured at room temperature
**titration to pH of 8

These results shows that at the same total alkalinity, trona solutions have a lower pH than $Na_2CO_3$ solutions to an extent which reduces the consumption of alkali by clay transformation reactions which is a key factor affecting the viability of the alkaline steam foam process.

In general, there are numerous mechanisms responsible for the consumption of bases in a subterranean earth formation. They include dissolution of quartz, dissolution of minerals such as gypsum and hydrite, or siderite, precipitation due to mixing with formation water, or ion-exchange, neutralization of hydrogen exchange sites on quartz or clay surfaces and transformation of clay minerals. And, in general, the consumption of alkali tends to increase with increase in reservoir temperature. However, the extent of the alkali consumption tends to be less with a carbonate (or other weak acid) buffered solution than with a carbonate-free solution of sodium hydroxide. For alkaline steam foam applications, two of these mechanisms are particularly important. The first is due to ion exchange and is equal to the product of the fraction of clays initially in divalent ion form times the cation exchange capacity (CEC) of the rock.

The second contribution is due to clay transformation in the presence of alkali. Clay components such as kaolinite and montmorillonite can react with alkali to form zeolites. As opposed to fast ion exchange reaction, clay transformation can occur slowly over a period of weeks or months, depending on temperature and alkali concentration. At elevated temperatures, alkali consumption by clay transformation reactions can be several times that by ion exchange. Consequently, the use of trona to reduce alkali consumption by clay transformation reactions offers a substantial improvement.

In the present process, as in the prior process, a kind and amount of water soluble alkaline material effective for causing precipitation of divalent cations and causing the aqueous liquid phase of the injected fluid to form soaps of substantially all of the petroleum acids in the reservoir oil, is injected along with or so as to become mixed with steam and steam-foaming surfactant. The alkaline material is preferably initially injected in a preflood in the form of a relatively concentrated aqueous solution, such as one equivalent to about 3 to 12 wt.% sodium carbonate solution and subsequently injected, continuously or intermittently, mixed with the steam being injected, in a concentration of less than about half the preflood concentration. Where the mixing is intermittent, alternate slugs of alkaline liquid and steam are preferably sized in sequence so that they form a substantially homogeneous mixture before or soon after entering the reservoir formation.

However, in the present process, the injected alkali material consists essentially of a substantially equal mixture of alkali metal carbonates and bicarbonates such as a mixture which is, or is substantially equivalent to, trona. In view of trona being a raw material from which commercial quantities of sodium carbonates and bicarbonates are produced, and therefore being a cheaper form of alkali metal carbonate, the use of trona is particularly preferred.

In the present process the aqueous alkaline solution formed by the mixing of the steam condensate and injected alkaline material should be arranged to provide an effectively low interfacial tension between the aqueous solution and the reservoir oil while at the same time providing a relatively high concentration of alkali which will be maintained throughout most of the reservoir. This can be accomplished by injecting components for forming such an aqueous alkaline solution in which the otherwise deleterious effects of a high electrolyte concentration are mitigated by the addition of a relatively small amount of preformed cosurfactant material. And, the kind and amount of such a material which is required for a given reservoir can be determined by tests which are feasibly inexpensive and accurate.

As known, when an aqueous alkaline solution contacts a crude oil which contains a significant amount of petroleum acids, surfactants are formed in situ. Such surfactants are, essentially, soaps of the petroleum acid components of the oil and are capable of producing a low interfacial tension between the oil and an aqueous solution. How low that interfacial tension will be is affected by factors inclusive of: the temperature to which the reservoir is heated by the injected steam, the kind and amount of petroleum acid components contained within the reservoir oil, the kind and concentration of alkali in the alkaline solution, the kind and amont of electrolytes dissolved in the injection alkaline solution, the kind and amount of electrolytes dissolved in the water in the reservoir, the properties of the reservoir oil, and the like, which are factors affecting the "salinity requirement" of the surfactant system formed within the reservoir.

A significant increase can be provided in the "salinity requirement" of a petroleum soap surfactant system formed within a reservoir. "Salinity requirement" refers to the concentration of dissolved electrolyte, inclusive of the excess alkali and the electrolyte which becomes dissolved while the aqueous solution is in the reservoir, which minimizes the interfacial tension between the reservoir oil and the surfactant system with which the oil is being contacted. The increase in salinity requirement can be provided by dissolving in the aqueous alkaline solution to be injected a preformed cosurfactant material which is more soluble in that solution, relative to the reservoir oil, than are the petroleum soaps formed from the reservoir oil. (In other words, a preformed cosurfactant material regarding which the solubility ratio based on solubility in the aqueous alkaline solution to solubility in the oil is greater for the preformed cosurfactant material than it is for the petroleum acid soaps.) For a typical reservoir oil, such an increase in the salinity requirement can make the salinity requirement equivalent to a concentration of alkali high enough to provide a satisfactory propagation rate of alkali through the reservoir.

In general, a preformed cosurfactant suited for use in the present invention is soluble in the aqueous alkaline solution formed by mixing the alkaline material with the condensate of the steam being injected into the reservoir, is an amphiphilic compound which is stable at the temperature of the injected steam and has a solubility in the alkali/brine solution relative to its solubility of the petroleum soaps (derived from the reservoir oil) in the alkali/brine solution relative to their solubility in the oil. Suitable preformed cosurfactants comprise amphiphilic molecules in which the polar groups are sulfonates, alcohols, or the alkoxylated derivatives of amphiphilic molecules containing such polar groups. The non-polar parts of such amphiphilic molecules can be, but are not restricted, aliphatic, aromatic or aliphatic-substituted aromatic hydrocarbon groups. Due to the low concentration of multivalent cations in aqueous alkaline solutions, amphiphilic molecules having more widely differing chemical structures may be useful as preformed surfactants in the present aqueous alkali solution than in conventional surfactant solutions, which have a substantially neutral pH. Particularly suitable preformed cosurfactants are typified by polyalkoxylated aliphatic or aromatic sulfonate or alcoholic surfactants inclusive of aromatic ether polysulfonates, such as the Dowfax aromatic ether polysulfonate surfactants described in U.S. Pat. No. 3,945,437 by Y. C. Chiu and H. J. Hill, amyl or isopropyl alcohol, alkyl or alkylarylpolyalkoxyalkylene sulfonates described in U.S. Pat. No. 4,269,271, Triton X-200 (sodium alkylarylpolyether sulfonate, from Rohm and Haas, Aerosol OT (dialkyl ester of sodium sulfosuccinic acid, from American Cyanamid), Enordet-AOS or IOS (alpha-olefin or internal olefin sulfonate surfactants, available from Shell Chemical Co.), AOS disulfonates, petroleum acid soaps such as the sodium salt of Sunaptic Acid B (from Sun Chemical Co.), etc. Such surfactants having a tendency to form steam foams in the absence of the soaps derived from the reservoir oil acids are especially preferred.

The steam used in the present process preferably has a quality of from about 10 to 90 percent and preferably about 30 to 80 percent, at the time it enters the reservoir formation. In general, it can be generated as a dry, superheated or wet steam and subsequently mixed with aqueous liquid. The steam can be generated at surface, or downhole locations and mixed with aqueous solutions of the alkaline material and surfactant at surface or downhole locations.

The concentration of the preformed cosurfactant being injected with steam (based on the water equivalent of the injected fluid) can be less than or about equal to the surfactant concentration used in conventional steam-foam drive processes such as those described in the patents mentioned above. A preferred range of concentration is about 0.1 to 5.0 weight percent of the aqueous phase of the steam entering the reservoir.

In addition, as described in U.S. Pat. Nos. 4,086,964 and 4,393,937, mentioned above, the steam-foaming surfactant can be substantially any which is capable of providing a steam foam permeability reduction factor lower than about 0.18. Numerous examples of such surfactants are listed in those patents. The alpha or internal olefin sulfonate surfactants, such as Enordet AOS 1618, are particularly suitable because of their capability of functioning as either or both the steam-foaming and preformed cosurfactant material.

What is claimed is:

1. In a process in which steam and steam-foaming surfactant are injected into a subterranean reservoir for displacing a relatively acidic oil toward a production location, which process includes injecting into the reservoir, at least as soon as at least some portion of the steam is injected, (a) a kind and amount of water soluble, alkaline material effective for ion-exchanging multivalent ions from the reservoir rocks and precipitating compounds containing those ions and for causing the aqueous liquid phase of the injected fluid to form soaps of substantially all of the petroleum acids in the reservoir oil, and (b) at least one surfactant arranged for foaming the steam and providing a preformed cosurfactant material capable of increasing the salinity requirement of an aqueous surfactant system in which soaps derived from the reservoir oil comprise a primary surfactant, an improvement comprising:

using as said water soluble alkaline material, a material consisting essentially of a substantially equal molar mixture of alkali metal carbonates and bicarbonates which is, or is substantially equivalent to, trona.

2. The process of claim 1 in which part of said alkaline material is injected as a relatively concentrated aqueous solution before injecting the steam.

3. The process of claim 1 in which a portion of steam is injected so that it forms a steam zone within the reservoir, at least one portion of said alkaline material is injected into the reservoir as a component of a relatively concentrated aqueous alkaline liquid mixed with steam and a preformed surfactant capable of functioning as said cosurfactant, and then, steam mixed with surfactant and a lower concentration of alkali is injected into the reservoir to provide an alkaline steam foam displacement of oil.

4. The process of claim 1 in which said surfactant comprises an olefin sulfonate surfactant capable of providing both the steam foaming and cosurfactant operations.

5. The process of claim 4 in which said alkaline material is a substantially equimolar of alkali metal carbonates and bicarbonates.

6. The process of claim 5 in which said alkali metal is sodium.

7. The process of claim 1 in which oil is recovered by a steam-foam soak process.

8. The process of claim 1 in which oil is recovered by a steam-foam drive process.

9. The process of claim 1 in which aqueous alkaline material and preformed cosurfactant are injected into the reservoir in the form of a steam-foam-forming mixture comprising steam, noncondensible gas, a steam-foaming surfactant inclusive of said preformed cosurfactant and an electrolyte which consists essentially of said alkaline material.

* * * * *